No. 691,906.  
W. T. JOHNSON.  
BICYCLE PROPULSION.  
(Application filed Dec. 29, 1897. Renewed June 23, 1900.)  
Patented Jan. 28, 1902.
(No Model.)
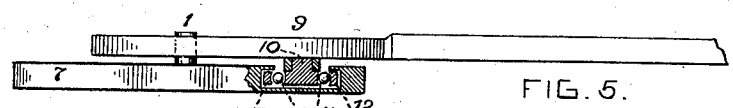
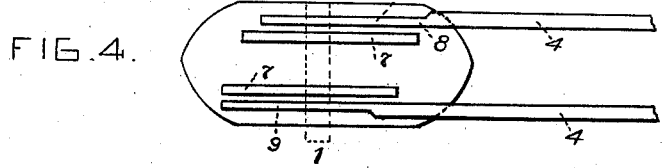
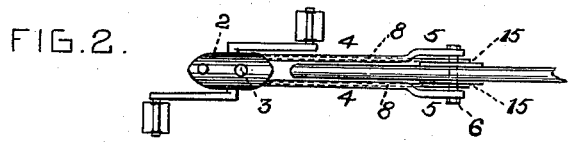
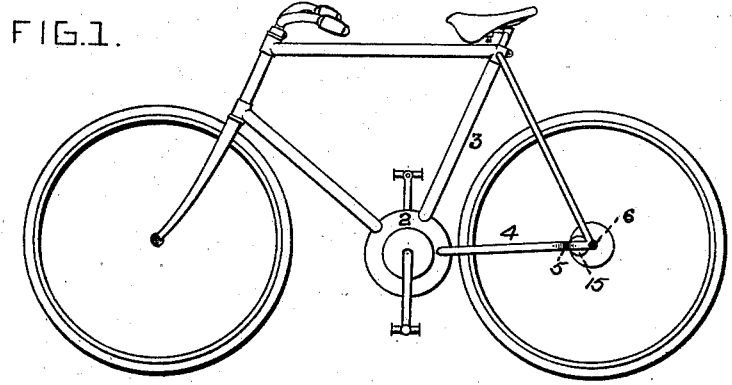
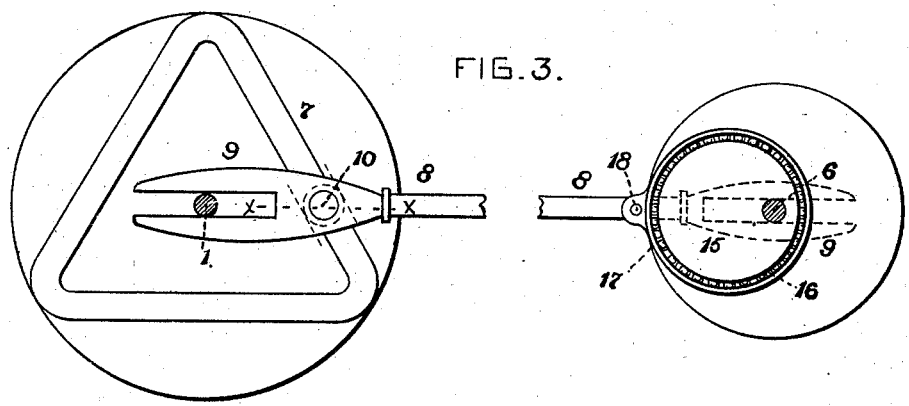
WITNESSES:  
Irwin W. Pierce.  
C. A. Pierce.
INVENTOR  
William T. Johnson.  
BY A. M. Pierce  
ATTORNEY.
THE NORRIS PETERS CO., PHOTO-LITHO., WASHINGTON, D. C.

UNITED STATES PATENT OFFICE.

WILLIAM T. JOHNSON, OF BROOKLYN, NEW YORK.

BICYCLE PROPULSION.

SPECIFICATION forming part of Letters Patent No. 691,906, dated January 28, 1902

Application filed December 29, 1897. Renewed June 23, 1900. Serial No. 21,379. (No model.)

*To all whom it may concern:*

Be it known that I, WILLIAM T. JOHNSON, a citizen of the United States, and a resident of Brooklyn, in the county of Kings and State of New York, have invented a new and useful Improvement in Bicycle Propulsion, of which the following is a specification.

My invention relates especially to means and mechanism employed for propelling bicycles and similar vehicles, and has for its object the provision of simple, compact, and effective mechanism without the use of the usual chain and sprocket.

To attain the desired end, my invention consists, essentially, in the combination, with the crank-shaft and driven wheel-axle of a bicycle, of a connecting-rod arranged to reciprocate in a direct line and means for imparting movement thereto; and my invention also involves certain other novel and useful combinations or arrangements of parts and peculiarities of construction and operation, all of which will be hereinafter first fully described and then pointed out in the claims.

In the accompanying drawings, forming a part hereof, Figure 1 is a side elevation of a bicycle embodying my invention. Fig. 2 is an enlarged plan view of a part of the frame, showing the location of the driving mechanism. Fig. 3 is an enlarged side elevation of the cam and connection to the axle of the rear wheel of the bicycle. Fig. 4 is a plan view of the crank-shaft, illustrating the arrangement of the cams thereon. Fig. 5 is a horizontal axial vertical view through the cam-wheel and cam at line *x x* of Fig. 3.

Similar numerals of reference wherever they occur indicate corresponding parts in all the figures.

The main portion of the bicycle-frame may be of any approved construction and arrangement modified only so far as the crank-hanger and base-rods are concerned to adapt the same to my propelling mechanism.

1 is the crank-shaft passing through a casing 2, wherein it is journaled in any of the well-known manners, the casing being connected to the seat-post tube 3 and to the horizontal frame-tubes 4. These tubes 4 are open at their ends where they enter the casing 2 and are curved outward at 5 to engage with the rear-wheel axle 6.

Fixed upon the crank-axle 1 are two cams 7, so relatively placed as to preclude any dead-center, as particularly illustrated in Fig. 4 of the drawings. 8 8 are two substantially horizontal rods, preferably provided at each extremity with forks 9, which pass over the crank-shaft 1 and rear-wheel axle 6, said axles acting as guides, while permitting a free reciprocation of the rods 8 in a fixed line. If desired, ball-bearings may be provided for the forks where they embrace the shaft 1. The rods 8 pass through the tubes 4, as indicated by the dotted lines in Fig. 2, and, if desired, slideways or guides may be arranged within the tubes 4 for the rods 8 and the forks 9 dispensed with without departing from the spirit of my invention. Projecting from each rod 8 is a stud 10, grooved upon its periphery at 11.

12 is a loose ring having a groove 13 in its inner face, the grooves 11 and 13 forming a seat for bearing-balls 14 and the ring 12 engaging with the cam 7, as particularly illustrated in Fig. 5. This arrangement is peculiarly adapted to remove the friction when the cam is in operation.

15 is an eccentric fixed upon each side of the rear-wheel axle 6. 16 is a series of bearing-balls located in a groove in the eccentric. 17 is an eccentric strap or ring having a groove in its inner face for the reception of the balls 16, said ring being pivotally connected to the rod 8 at 18.

When constructed and arranged in accordance with the foregoing description, my improved method of propelling bicycles has many advantageous features. Friction is reduced to a minimum and all the parts are effectually concealed and protected from dust, dirt, and moisture. The parts are few in number and not susceptible of disarrangement. The movement of the driving-rod is direct and in a fixed line. As shown in the drawings, in the present construction the rotation of the driven wheel is three to one of the crank-shaft; but I do not confine myself to this particular arrangement of surfaces to the cam, as it may be varied at pleasure and two cam-wheels may be employed, if desired. In such an arrangement the two cam wheels or rings encircling the studs 10 are located at each side of the cam, upon the rod 8, and enter the grooves of the cams. The result of this arrangement is to cause each stud-ring or cam-wheel to bear at all times upon either the inner or outer side of the cam-groove and operate the reciprocating rods continuously. A fixed point of bearing is thus obtained whereby the distance of such bearing from the center of the crank-shaft is uniform no matter in what position the studs 10 and connected rings may be located.

Having now fully described my invention, what I claim as new therein, and desire to secure by Letters Patent, is—

1. In a bicycle, a cam fixed upon the crank-shaft, and an eccentric fixed upon the driven-wheel axle, in combination with a rod arranged to reciprocate in a fixed line, said rod being connected with the cam at one end, and bearing a pivoted eccentric-ring at the other, substantially as shown and described.

2. In a bicycle, a cam fixed upon the crank-shaft, and an eccentric fixed upon the driven-wheel axle, in combination with a rod arranged to reciprocate in a fixed line, said rod having fixed bearings which embrace the crank-shaft and driven-wheel axle, and being connected with the cam at one end, and with a pivoted eccentric at the other, substantially as shown and described.

3. In a bicycle, the combination with a driving-rod arranged to be reciprocated in a direct line by the rotation of the crank-shaft, of an eccentric strap or ring pivoted thereto, and engaging an eccentric upon the driven-wheel axle, substantially as shown and described.

In testimony that I claim the foregoing as my invention I have signed my name, in presence of two witnesses, this 23d day of December, 1897.

WILLIAM T. JOHNSON.

Witnesses:
A. M. PIERCE,
C. A. PIERCE.